Sept. 23, 1969  H. H. WALL ET AL  3,468,967

PRODUCTION AND PURIFICATION OF VINYL CHLORIDE

Filed Jan. 27, 1967

United States Patent Office  3,468,967
Patented Sept. 23, 1969

3,468,967
PRODUCTION AND PURIFICATION OF VINYL CHLORIDE
Henry H. Wall and Eric P. Breidenbach, Baton Rouge, La., and Leo A. Miller, Lakeland, Fla., assignors to Ethyl Corporation, New York, N.Y., a corporation of Virginia
Continuation-in-part of application Ser. No. 362,786, Apr. 27, 1964. This application Jan. 27, 1967, Ser. No. 612,109
Int. Cl. C07c 17/34, 17/38; B01d 3/14
U.S. Cl. 260—656         8 Claims

ABSTRACT OF THE DISCLOSURE

This invention relates to a novel process for the production and purification of vinyl chloride by thermal decomposition of dichloroethane and high pressure distillation of the product mixture to recover vinyl chloride. The present invention utilizes a combination of dual distillation zones which coact to cancel the effects of "sloppy" cuts in each zone and thus achieve substantially pure product streams and a substantially pure recycle stream while still effecting a considerable refrigeration saving.

CROSS-REFERENCES TO RELATED APPLICATIONS

This application is a continuation-in-part of application Ser. No. 362,786 filed Apr. 27, 1964, and now abandoned.

BACKGROUND OF THE INVENTION

It is known that vinyl chloride can be produced by thermally decomposing either 1,2-dichloroethane or 1,1-dichloroethane or both in a cracking furnace at temperatures of about 400° C. and higher. This decomposition involves the splitting off of hydrogen chloride from the dichloroethane molecule, and the resulting mixture of reactants and cracking products presents a difficult separation problem. One difficulty encountered in commercial applications of the process is the expense of costly refrigeration systems and refrigerants necessary for the purification of the product stream from the cracking furnace.

It is an object of this invention to provide a process wherein the requirement for refrigeration in the product distillation columns is greatly minimized.

Another object of this invention is to provide a process for the commercial production of vinyl chloride in a more simple and economical manner.

SUMMARY OF THE INVENTION

This invention relates to a process for the production of vinyl chloride comprising in combination the steps of decomposing dichloroethane to produce a mixture containing vinyl chloride, hydrogen chloride, and unreacted dichloroethane; preparing a liquid portion and a gaseous portion from said mixture; distilling at least part of the liquid portion of said mixture to produce a gaseous stream containing vinyl chloride, hydrogen chloride and a quantity of unreacted dichloroethane, and a liquid stream comprising substantially pure unreacted dichloroethane; further distilling said gaseous stream in combination with at least part of the gaseous portion of said mixture to produce a first gaseous effluent comprising substantially pure hydrogen chloride, a second gaseous effluent comprising substantially pure vinyl chloride, and a liquid effluent containing unreacted dichloroethane and a quantity of vinyl chloride; and recycling said liquid effluent to be further distilled with said at least part of the liquid portion of said mixture.

BRIEF DESCRIPTION OF THE DRAWING

For a more complete understanding of the present invention, reference is made to the accompanying drawing, which is a diagrammatic illustration of a system which may be suitably employed to conduct the process as hereinafter described.

DESCRIPTION OF THE PREFERRED EMBODIMENTS

Figure 1:
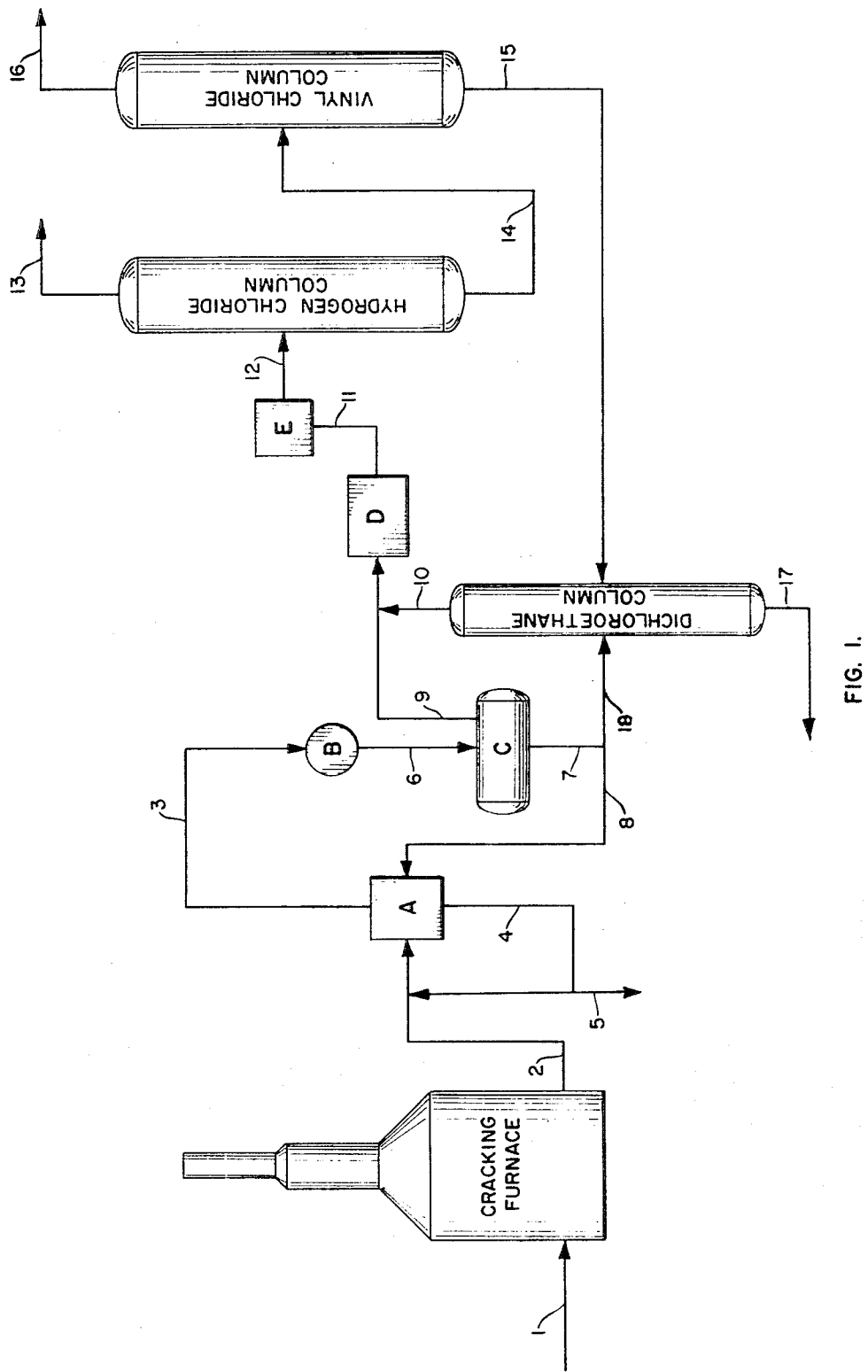

Dichloroethane (either 1,1-dichloroethane or 1,2-dichloroethane) is fed by line 1 into a thermal cracking zone, e.g. a furnace, which may be an unpacked reaction vessel supplied with heating means. The pressure of the gaseous reactants within the zone is maintained at from about atmospheric pressure to less than about 100 pounds per square inch gauge and preferably from about 25 pounds per square inch gauge to about 100 pounds per square inch gauge. The temperature within the zone is generally maintained at from about 800° F. to about 900° F. and preferably from about 825° F. to about 875° F.

The gaseous product stream from the thermal cracking zone is withdrawn via line 2 at a temperature of from about 825° F. to about 875° F. and quenched by a circulating liquid stream 4 from a quenching zone, e.g. knockout drum A, to reduce the temperature of stream 2 to about 250° F. and thereby form a gaseous phase and a liquid phase. Stream 4 is supplied by circulating a part of this liquid phase. A small part of stream 4 comprising carbon and tars may be withdrawn via stream 5 and sent to waste disposal if necessary.

The gaseous phase is withdrawn via line 3 from the quenching zone and passed to a condensation zone, e.g. condenser B. Therein the vapor stream is partially condensed to a liquid portion and a gaseous portion, which coexist as a two-phase mixture. This two-phase mixture is passed from the condenser via line 6 into a disengaging zone or a knockout drum C wherefrom the liquid portion, which is composed principally of dichloroethane, is removed via line 7. Part of the liquid portion is recycled to the quenching zone via line 8 to be reunited with the liquid phase. The remainder of stream 7 is passed via line 18 to a distillation zone, preferably though not necessarily a single column, wherein a pressure of from about 30 pounds per square inch gauge to about 60 pounds per square inch gauge is maintained. This zone is depicted in the drawing as a single column and is labelled the Dichloroethane Column.

The gaseous portion from drum C is withdrawn via line 9 at a temperature of from about 90° F. to about 110° F. and a pressure of from about 30 pounds per square inch gauge to about 50 pounds per square inch gauge and is compressed together with stream 10, a gaseous stream from the Dichloroethane Column, in a compression zone, e.g. compressor D, to a pressure of less than 300 pounds per square inch gauge and preferably within the range of from about 150 pounds per square inch gauge to about 200 pounds per square inch gauge. In a typical process run, stream 11 comprises about 55 percent hydrogen chloride, about 43 percent vinyl chloride and about 2 percent dichloroethane. The temperature of the compressed stream ranges from about 315° F. to about 335° F.

The compressed stream 11 is cooled in cooling zone E to a temperature of from about 50° F. to about 150° F., and preferably from about 90° F. to about 110° F., to form a two-phase liquid-gas stream, and this stream is transmitted by line 12 to a fractionation zone, preferably though not necessarily comprising two columns as shown in the drawing. The first column, labelled the Hydrogen Chloride Column, is maintained at a pressure of from about 150 pounds per square inch gauge to about 200 pounds per square inch gauge. This column contains distillation trays or their equivalent in the form of packing. The overhead from this column, which contains substantially all of the hydrogen chloride as a substantially pure by-product, is withdrawn via line 13 at a temperature of from about −20° F. to about −10° F., and the heavy ends of the column containing primarily vinyl chloride and some unreacted dichloroethane are removed at a temperature of from about 160° F. to about 180° F. and transmitted via line 14 to a second distillation column. This column, labelled the Vinyl Chloride Column, is maintained at a pressure of from about 140 pounds per square inch gauge to about 160 pounds per square inch gauge. From this column the remaining dichloroethane is withdrawn at a temperature of from about 190° F. to about 210° F. in a bottoms stream having a substantial quantity of vinyl chloride therein. The vinyl chloride may range from about 40 weight percent to about 60 weight percent of the bottoms stream. This stream is recycled via line 15 to the first distillation zone which is depicted as the Dichloroethane Column in the drawing.

Substantially pure vinyl chloride is recovered from the top of the second column at a temperature of from about 90° F. to about 110° F. This stream is removed via line 16 and sent to storage. It is possible to achieve substantially pure vinyl chloride and dichloroethane by making offsetting "sloppy" cuts in the Vinyl Chloride and Dichloroethane Columns. Thus, while pure vinyl chloride is removed via line 16, a considerable amount of vinyl chloride is also removed via line 15 along with unreacted dichloroethane. This "sloppy" cut is offset in the Dichloroethane Column which separates the feed streams 15 and 18 into a stream 17 of substantially pure dichloroethane and an impure stream 10 containing a quantity of dichloroethane which is subsequently returned to the Hydrogen Chloride Column and Vinyl Chloride Column. Stream 17 from the Dichloroethane Column is removed at a temperature of from about 270° F. to about 290° F. and after purification may be recycled to the thermal cracking zone.

As explained, the present invention utilizes dual distillation zones which coact to cancel the effects of "sloppy" cuts in each and thus achieve substantially pure product streams and a substantially pure recycle stream while still effecting a considerable refrigeration saving. The term "sloppy" is a word peculiar to the art. By this term it is meant that a distillation column is operated under such conditions that a substantially pure product stream is obtained. Such a product stream may be either the overhead or bottoms of the column, but not both, since the other stream from the column is impure with some quantity of the material comprising the product stream. A "sloppy" cut is the opposite of a "sharp" cut which means that a distillation column is operated under such conditions as to obtain a substantially pure overhead and a substantially pure bottoms. Columns utilizing "sharp" cuts are difficult to control and require considerable refrigeration. The present invention avoids these difficulties by utilizing "sloppy" cuts. And, through coacting distillation zones, the impure overhead from the first zone is transformed in the second zone into a pure overhead and impure bottoms, and the impure bottoms from the second zone is returned to the first zone to be transformed into a pure bottoms and an impure overhead. Hence, the two "sloppy" cuts cancel out and a pure product overhead and a pure recycle bottoms are achieved.

In order that those skilled in the art can thus appreciate the process of this invention, the following examples are given by way of description and not by way of limitation.

Example I 1,2-dichloroethane at 90 p.s.i.g. and 350° F. and chlorine at 90 p.s.i.g. and 120° F. were fed into an unpacked cracking furnace. The temperature within the furnace was maintained at from about 350° F. to about 850° F. A stream was withdrawn from the furnace which contained about 33 percent 1,2-dichloroethane, about 33 percent vinyl chloride and about 33 percent hydrogen chloride and small amounts of other chlorinated compounds such as 1,1,2-trichloroethane. This stream from the furnace was at a temperature of about 850° F. and a pressure of about 60 p.s.i.g. The stream was quenched and fed into a knockout drum. A liquid stream from the knockout drum at 225° F. was recirculated as a quench medium. A vapor stream from the drum at 225° F. and 55 p.s.i.g. was withdrawn and passed to a condenser, partially condensed and cooled to a temperature of 100° F., and then sent to a disengaging drum wherein the stream was separated into a liquid and a gas phase. The liquid phase was composed primarily of 1,2-dichloroethane; 70 weight percent of this liquid was recycled back to the knockout drum. The balance of the liquid was passed to a Dichloroethane Column which was operated at a pressure of about 50 p.s.i.g. The gaseous phase, which was composed primarily of vinyl chloride and hydrogen chloride, was passed at a pressure of about 45 p.s.i.g. and a temperature of about 100° F. along with a vapor stream from the Dichloroethane Column at a temperature of 100° F. into a compressor wherein the pressure was raised to about 200 p.s.i.g. and the temperature was raised to about 335° F. This compressed stream was cooled in a heat exchanger to a temperature of about 100° F. and sent to a Hydrogen Chloride Column. This distillation column was equipped with standard distillation trays and a reflux condenser and was operated at a pressure of 170 p.s.i.g. Substantially pure hydrogen chloride was recovered from the overhead of the column at a temperature of −15° F.; the bottoms, composed of vinyl chloride and 1,2-dichloroethane at a temperature of about 170° F., was fed into a Vinyl Chloride Column equipped wtih trays and a reflux condenser and operated at a pressure of 150 p.s.i.g. Substantially pure vinyl chloride was recovered as the overhead at a temperature of 100° F. This vinyl chloride product contained essentially no 1,2-dichloroethane. The bottoms from the vinyl chloride column at a temperature of 205° F. and containing about 40 weight percent of vinyl chloride and 60 weight percent of 1,2-dichloroethane was recycled to the Dichloroethane Column.

Example II

The process of Example I is repeated substituting 1,1-dichloroethane for 1,2-dichloroethane.

Thus having fully described the invention, what is claimed is:

1. A process for the production of vinyl chloride comprising in combination the steps of:
 (A) decomposing dichloroethane to produce a mixture containing vinyl chloride, hydrogen chloride, and unreacted dichloroethane;
 (B) preparing a liquid portion and a gaseous portion by partially condensing said mixture;
 (C) distilling at least part of the liquid portion of said mixture to produce:
  (a) a gaseous stream containing vinyl chloride, hydrogen chloride and a quantity of unreacted dichloroethane, and
  (b) a liquid stream consisting essentially of substantially pure unreacted dichloroethane;
 (D) fractionating said gaseous stream in combination with at least part of the gaseous portion of said mixture to produce:
  (a) a first gaseous effluent consisting essentially of substantially pure hydrogen chloride,
  (b) a second gaseous effluent consisting essentially of substantially pure vinyl chloride, and
  (c) a liquid effluent containing unreacted dichloroethane and a quantity of vinyl chloride; and
 (E) recycling said liquid effluent to be further distilled with said at least part of the liquid portion of said mixture.

2. The process of claim 1 wherein said dichloroethane is 1,2-dichloroethane.

3. The process of claim 1 wherein the partial condensation of the mixture begins with a quench by recycled condensate.

4. The process of claim 3 wherein at least a part of said liquid stream is recycled to be decomposed to said mixture.

5. The process of claim 3 wherein the fractionation of said gaseous stream in combination with at least a part of said gaseous portion is effected in two distillation columns to produce:
(a) substantially pure gaseous hydrogen chloride from the first of the two columns,
(b) substantially pure gaseous vinyl chloride from the second of the two columns, and
(c) impure liquid dichloroethane containing a substantial quantity of vinyl chloride from the second of the two columns.

6. A process for the production of vinyl chloride comprising, in combination, the steps of:
(A) decomposing dichloroethane to produce a mixture containing vinyl chloride, hydrogen chloride and unreacted dichloroethane;
(B) fractionating at least part of a condensed portion of said mixture in a primary distillation zone to produce:
  (a) a gaseous stream comprising vinyl chloride, hydrogen chloride and unreacted dichloroethane, and
  (b) a liquid stream consisting essentially of substantially pure unreacted dichloroethane;
(C) fractionating said gaseous stream to produce:
  (a) a first gaseous effluent consisting essentially of substantially pure hydrogen chloride,
  (b) a second gaseous effluent consisting essentially of substantially pure vinyl chloride, and
  (c) a liquid effluent comprising unreacted dichloroethane and vinyl chloride; and
(D) recycling said liquid effluent to be further distilled in said primary distillation zone.

7. The process of claim 6 including recycling said liquid stream consisting essentially of substantially pure unreacted dichloroethane to the decomposing step (A).

8. In the process of separating vinyl chloride and dichloroethane from the mixture produced by low pressure cracking said dichloroethane to produce vinyl chloride, the improvement according to which at least part of said mixture is partially condensed to form liquid and gaseous portions, at least part of the liquid portion is subjected to a distillation to leave a substantially pure dichloroethane residue and distill off a gaseous stream comprising the hydrogen chloride and vinyl chloride contents of said liquid portion along with some dichloroethane, the gaseous portion of the partially condensed mixture and the distilled-off gaseous stream are combined and fractionated at a high pressure as compared with the foregoing distillation to drive off substantially all its hydrogen chloride, the residue from that fractionation is distilled to distill off substantially pure vinyl chloride and leave a residue of dichloroethane containing vinyl chloride, and the last mentioned residue is subjected to distillation in admixture with the liquid portion of the partially condensed reaction mixture.

References Cited

UNITED STATES PATENTS 2,724,006  6/1954  Krekeler _____ 260—656
3,055,955  9/1962  Hodges _____ 260—656

FOREIGN PATENTS 938,824  10/1963  Great Britain.

BERNARD HELFIN, Primary Examiner

J. BOSKA, Assistant Examiner

U.S. Cl. X.R.
203—75, 82